No. 656,779. Patented Aug. 28, 1900.
C. H. WILSON.
HANDSAW.
(Application filed Jan. 15, 1900.)
(No Model.) 2 Sheets—Sheet 1.
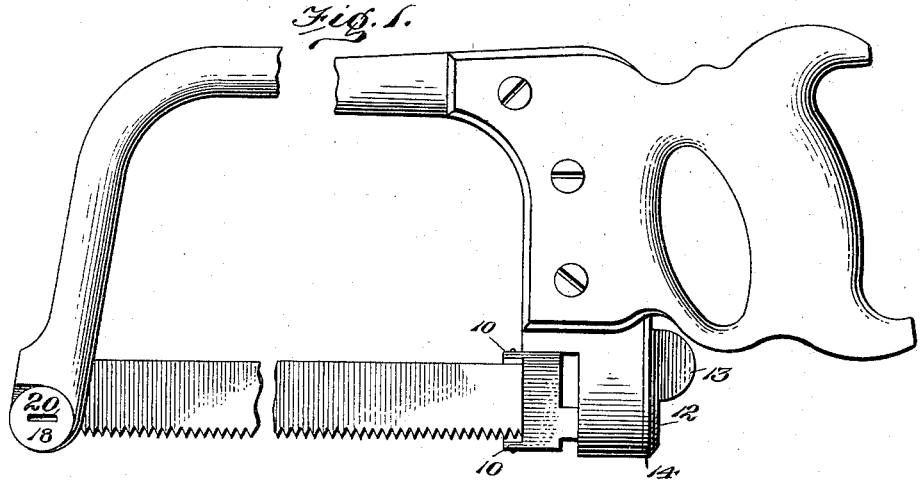
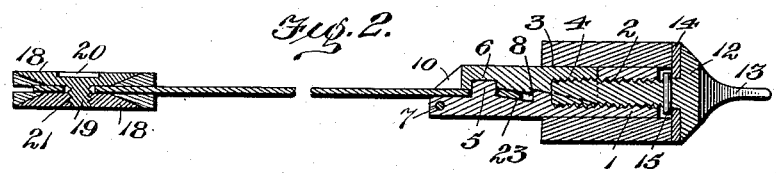
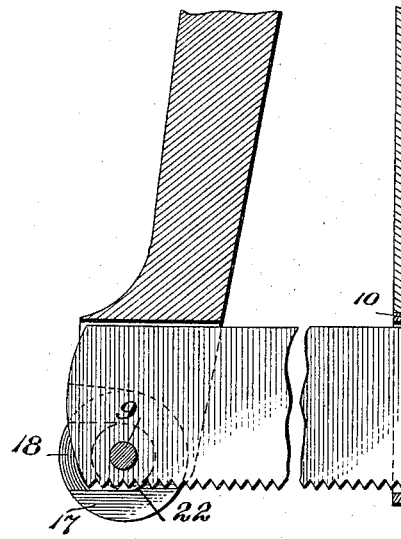
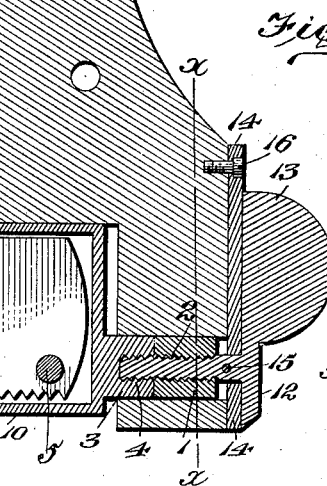
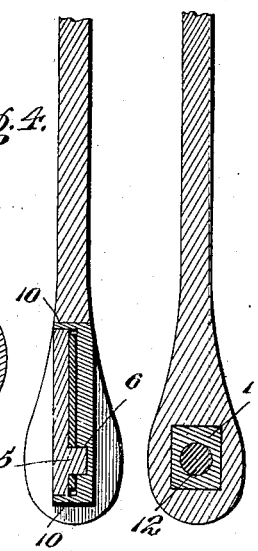
WITNESSES:
H. G. Dieterich
John E. Burch
INVENTOR
Charles Howard Wilson
BY
Johnson and Johnson
ATTORNEYS No. 656,779. Patented Aug. 28, 1900.
C. H. WILSON.
HANDSAW.
(Application filed Jan. 15, 1900.)
(No Model.) 2 Sheets—Sheet 2.
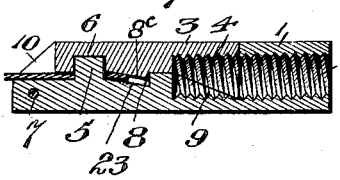
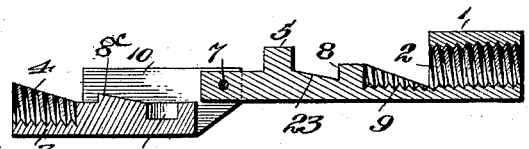
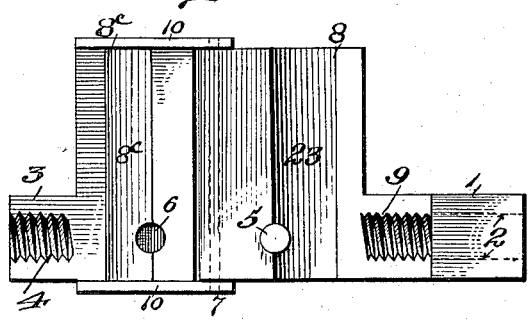
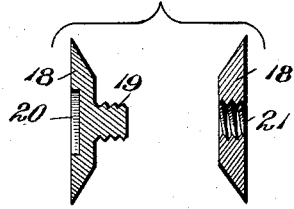
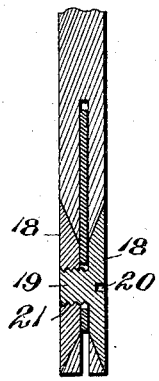
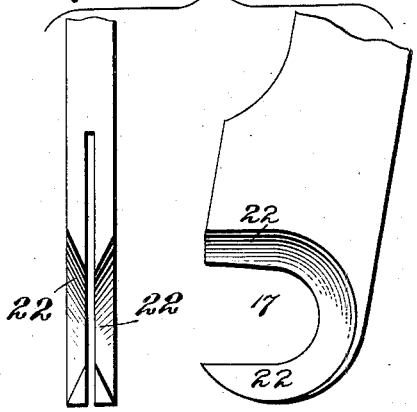
WITNESSES: INVENTOR
H. S. Dieterich Charles Howard Wilson
John E. Burch BY Johnson & Johnson
ATTORNEYS

UNITED STATES PATENT OFFICE.

CHARLES HOWARD WILSON, OF NEW YORK, N. Y.

HANDSAW.

SPECIFICATION forming part of Letters Patent No. 656,779, dated August 28, 1900.

Application filed January 15, 1900. Serial No. 1,534. (No model.)

*To all whom it may concern:*

Be it known that I, CHARLES HOWARD WILSON, a citizen of the United States, residing at New York, (Brooklyn,) in the county of Kings and State of New York, have invented certain new and useful Improvements in Handsaws, of which the following is a specification.

The invention herein is directed to novel constructions in a handsaw whereby the blade is secured to the frame in a manner to obtain firmness and durability, with facility for removal and replacement, to maintain a perfect support of the blade, and to provide a direct tension thereon near the line of the teeth, which gives better results; and my invention consists of devices and combinations of devices, which will be set out in the claims and which are illustrated in the accompanying drawings, in which—

Figure 1 shows in side view the handle and off-end parts of the saw-frame and the blade secured thereto by my new construction and devices. Fig. 2 is a horizontal section showing the fastenings for the blade to the ends of the frame. Fig. 3 is a vertical longitudinal section taken through the same parts. Fig. 4 is a vertical transverse section taken through the blade set-pin and buckle at the handle end of the saw, and Fig. 5 is a like view on the line $x$ $x$ of Fig. 3. Fig. 6 shows the buckle in edge view. Fig. 7 shows the same in longitudinal section. Fig. 8 shows the same in transverse section, and Fig. 9 shows the same in longitudinal section, the parts opened to show their connecting-pivot. Fig. 10 is a face view of the inner sides of the hinged opened buckle parts. Fig. 11 is a vertical section through the off end of the frame, showing the beveled circular blade-clamping binders. Fig. 12 shows in section the circular beveled clamping-binders for the off end of the blade, and Fig. 13 shows the recessed and beveled construction of the off end of the frame for the blade binder parts.

While I have shown my new blade-fastening devices as applied to what is known as a "meat-saw," they may be applied to saws for general use.

A metal frame is shown the ends of which have a construction adapted to receive my new blade-fastening devices. At its handle end the frame has a recess at its inner edge, preferably of rectangular form, and a horizontal opening in the recessed part, as in Figs. 2, 3, and 5. This opening is preferably of rectangular form in cross-section, and into it the shank of the blade-fastening buckle is secured with the buckle parts fully within the recess. Two members which are adapted by their meeting faces to bind and secure the saw-blade constitute the buckle and are preferably hinged or pivoted together at their blade-connecting ends, their other ends being bound together within the opening of the frame. One of these members is longer than the other and terminates in the square shank part 1, which has a screw-threaded hole 2. The other shorter part has a matching shank part 3, formed with a screw-threaded recess 4, which joins and forms a continuation of the threaded hole in the longest shank part, so that the screw-hole extends through the longest shank part into the shortest shank part, and both shank parts are within the opening of the frame, as in Fig. 3. The meeting faces of these buckle parts are preferably much wider, as in Fig. 10, than the shanks and extend beyond the upper side of the shanks in fitting within the frame-recess, as in Fig. 3, and one of these parts, preferably the longest part, is formed with a bearing-boss 5, which has the function of a set-pin, while the matching shorter member has a recess 6 to receive the bearing set-pin with the blade between the members and engaged by a hole with the set-pin. The clamping function of the members upon the blade is made by the engagement of the shank parts with the walls of the frame-opening and the pivoting or hinging of the outer ends of the members, as seen in Fig. 2. For this purpose the pivot 7 of these members is at one side of the blade, Figs. 2 and 7, and this allows the blade by a hole therein to be engaged with the set-pin and the two members to be closed or lapped and their clamping-faces interlocked upon the blade and the screw-shank parts in alinement for insertion into the frame-opening. Preferably the meeting face of the longest member is sunk on an incline from the set-pin toward the shank and terminates in a shoulder 8, and into which incline the end of the blade is sunk by bending, as in Fig. 2, the swell $8^c$ of the shortest member effecting such bending in being closed upon the blade. Between the surface-shoulder 8 and the inner end of the shank part 1 the screw-thread of the latter is extended in a surface-recess 9, Figs. 9 and 10, on each side of which the surface is oblique to the axis of the screw-hole, and the meeting face of the other member is also oblique and forms a sort of interlocking shoulder which reinforce the set-pin and prevent any unequal drawing action of the separate buckle parts upon the blade or upon the pivot-pin, while the square frame-opening keeps the shank parts firmly bound together upon their oblique surfaces, as in Fig. 2. The pivoting of the members is preferably made by side flanges 10 on the short member, through which the pivots 7 pass into the other member, while these side flanges also serve to form a closure for the edges of the blade and for the longest buckle part which fits closely between the walls of these flanges, as in Fig. 8. A screw 12 is screwed into both the buckle-shank parts from the outer open end of the frame-opening, whereby the buckle is drawn into the frame-recess to put the proper tension upon the blade, and I prefer to form the head of this screw with a thumb-lever part 13, by which it may be turned. The screw engages both the buckle shank parts as a single nut and draws upon the parts which, by the seating of the buckle parts against the wall of the recess and the seating of the buckle-shanks within the frame-opening, renders the buckle firm in its frame connections as a single part and keeps the blade well braced and taut.

To prevent the adjusting-screw from endwise movement, I provide a locking-plate 14, Fig. 3, which serves as a cover for the outer end of the frame-opening and through a hole in which plate the screw passes and is locked to the plate by a pin 15, fixed in the shank of the screw on the inner side of said plate. To keep the locking-plate in place, it is fastened to the frame, and I prefer to use such plate, because it can be fastened to the screw and driven home with the turning of the screw and then fastened to the frame by the screw 16; but other means may be provided for securing the screw to the frame.

The outer or off end of the frame is split to give it the function of a clamp upon the blade, the end of which projects through the split. At these split parts their outer edges are formed with open recesses 17, Fig. 13, which forms a seat upon which the blade is secured by means and in a way which I will now describe. The closed end of the recess is semicircular, and at its outer side each split part is beveled around the recess toward the split, as at 22. A beveled circular binder 18 is seated within the recess of each split part and screwed together upon the blade, to thereby bind and secure it to the frame. The bevel of the binder parts and of the frame match, and I prefer that one of the beveled binders shall also form the clamping-screw 19, Fig. 12, projecting from its inner side, its outer side provided with the screw-head nick 20, so that the screw passing through a hole in the blade engages a screw-threaded opening 21 in the other binder. This bevel construction of the circular binders and frame gives a sort of wedge function of the fastening parts and a perfect binding action upon the blade and upon the frame. At the split end it is made wide enough to form a sheath for the saw-blade and to bring the binder-plates within the width of the split end.

Referring to Fig. 3, it will be noted that the blade-bearings at both ends and the adjusting-screw of the buckle are in alinement close to the bottom of the buckle and that the line of tension is brought near the toothed edge which is the line of contact of the blade, and this I find gives better results in a firm support and preventing the swaying of the blade than can be obtained in mounting the blade mediately of its width. The seating of the buckle within the frame-recess gives the advantage of bringing the buckle within the width of the frame and of an unobstructed cutting-surface of the blade between the ends of the frame, while the circular seating of the beveled binders keeps the blade true, relieves the binder-screw of undue strain, and renders the assembling of the parts easily and quickly made. It is important also to note that the inclining of the surface from the set-pin to the shoulder is to provide a sinkage 23, Fig. 9, the full width and thickness of the blade, so that when the latter is adjusted upon the set-pin and the buckle closed the end of the blade from the center of the set-pin is bent into the incline, Fig. 2, by the counterpart swell 8° and bound more securely by the sinkage and the bend of the blade therein. This inclined sinkage also gives the advantage of allowing blades of different thickness to be used with the same effectiveness. It is also important to note that the set-pin and the circular beveled binders give a cylindrical or convex bearing and fastening for the blade, and therefore prevent it from being twisted in straining it upon the bearings, that the confining of the shanks of both buckle parts within a square socket enhances the effectiveness of this result, that the blade is fastened to the buckle parts between the pivot-connected ends and the shanks of the buckle, and that the blade has a circular seating upon the off end of the frame, a circular bearing at its handle end, and an angular clamping and adjusting part connecting the part which contains the circular bearing part.

It will of course be understood that so far as the primary features of my invention are concerned the fastening devices for the blade may take various forms and that various alterations in the construction of these parts might be made without changing the functions and advantages stated. Obviously the form or contour of the off-end frame-bearing parts and the binders may be changed, the purpose of the recess and binding parts being to distribute the strain upon the entire clamping-surfaces, while the clamping function is directed positively upon the split frame parts and independently upon the blade with an equal pressure upon both to clamp the blade by and between the split parts and by and between the binder parts.

Certain separate and distinct features of improvement as to parts and combinations of parts described herein and illustrated in the accompanying drawings and not claimed herein are made the subject of and embodied in a separate application filed by me concurrently herewith.

I claim as my improvement—

1. In combination with the saw-blade and a frame having the corner at its inner edge at the handle end recessed, at right angles to said edge, an opening in said recessed part below the horizontal wall thereof, a clamp for the blade arranged within said angular corner space or recess and within said frame-opening, and a screw secured to the frame within said opening engaging the clamp whereby the clamp is housed within the corner space at the inner edge of the frame, the upper edge of the clamp abutting said horizontal wall.

2. For fastening the handle end of the saw, the frame having its inner-edge corner at the handle end recessed, at right angle to said edge, an opening in said recessed part below the horizontal wall thereof, a clamp of two parts for the blade, means for engaging the blade and interlocking the clamp parts thereon, means consisting of clamp-shanks whereby said clamp is secured within the frame corner recess and means consisting of a screw fastened to the frame for securing and adjusting the clamp within the frame-opening.

3. In a saw and in combination with the frame and the blade, a fastening device for the off end of the blade consisting of beveled bearing-plates and a clamp-screw, a fastening device at the handle end of the blade consisting of a clamp having a cylindrical pin and shank parts engaging the frame and an adjusting-screw engaging the frame and the clamp-shanks.

4. In a saw and in combination with the frame and the blade, a clamp device of two members, one of which has a cylindrical bearing-pin for engaging a hole in the blade, the other a recess for engaging the pin on the other side of the blade, an inclined sink in one of the members and the corresponding swell in the other member whereby the end of the blade is bent out of line, between the meeting faces of the clamp, means whereby the members are connected at each end, and clamped upon the blade and means whereby the clamped members are adjustably secured to the handle end of the frame.

5. In combination with the blade, a frame having in its handle end an opening of angular cross-section, means secured therein connecting and clamping the blade, a screw engaging said means, a plate through which the screw passes, secured to the frame over the outer end of said angular opening, and a pin passing through the screw-stem at the inner wall of said plate, whereby the screw is locked against endwise movement within the frame-opening.

6. For fastening the off end of the saw, the end of the frame split and formed at its outer edge with a recess at the split parts, a clamp of two parts each constructed with a surface part for engaging the outside walls of the frame, and a surface part for engaging the blade and means passing through the blade and engaging the clamp parts upon the blade and upon the frame.

7. For fastening the off end of the saw, the end of the frame split and formed at its outer edge with a concave recess, beveled toward the split on each side of the frame, a clamp of two parts the edges whereof are the counterpart of and seated upon the beveled edges of the recess and means passing through the blade and engaging the clamp parts with a clamping function upon the blade and upon the frame.

8. In a saw and in combination with the blade and the frame having its off end split, its outer edge formed with a concave recess, at the split parts and beveled around the outer sides toward the split, of circular binder parts beveled around their edges and means whereby they are clamped within the recess upon the beveled frame and upon the blade.

9. In a saw and in combination with the blade and a frame having its off end split, and formed at its outer edge with a concave recess, beveled around the outer sides toward the split, of circular binder parts beveled around their edges, one of which has a screw-threaded hole, the other a screw-stem for engaging the threaded hole whereby to bind the beveled parts together upon the beveled frame and upon the blade within the recess of each split part.

10. The saw-frame having its off end split, formed with a concave recess on its outer edge beveled inward around its edge, the handle end of the frame formed at its inner edge with a corner right-angled recess or space and an opening in said recessed part below the horizontal wall thereof, in combination with the blade, beveled bearing clamping-plates for the off end of the blade, a clamp-screw for said beveled plates, a buckle-clamp having a mounting-pin for the blade, and secured within the frame-opening and within the corner recess, and a screw secured to the frame and to the buckle-clamp.

In testimony whereof I affix my signature in presence of two witnesses.

CHARLES HOWARD WILSON.

Witnesses:
 FREDERICK J. DASSAU,
 THEODORE RITTER.